B. E. SHATTUCK.
BEATER OR AGITATOR.
APPLICATION FILED OCT. 2, 1911.
1,141,420.
Patented June 1, 1915.
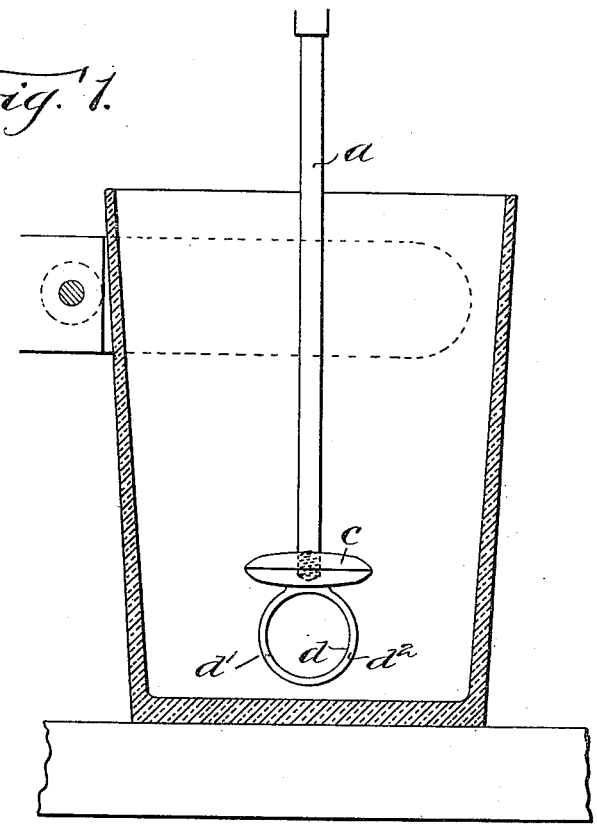
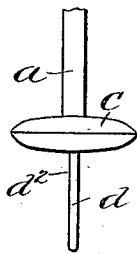
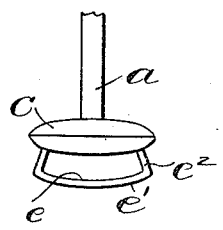
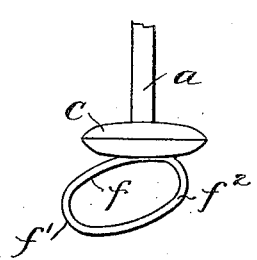
Witnesses:
Inventor:
Burt E. Shattuck

UNITED STATES PATENT OFFICE.

BURT E. SHATTUCK, OF BOSTON, MASSACHUSETTS, ASSIGNOR TO DOW SURGICAL BATTERY COMPANY, OF BOSTON, MASSACHUSETTS, A CORPORATION OF MASSACHUSETTS.

BEATER OR AGITATOR.

1,141,420.     Specification of Letters Patent.     Patented June 1, 1915.

Application filed October 2, 1911. Serial No. 652,296.

*To all whom it may concern:*

Be it known that I, BURT E. SHATTUCK, of Boston, in the county of Suffolk and State of Massachusetts, have invented certain new and useful Improvements in Beaters or Agitators, of which the following is a specification.

This invention relates to a beater capable of stirring and beating fluids such as cream, eggs and batters of all sorts, but particularly for whipping cream.

The device is particularly intended to be secured upon the end of a rapidly rotating rod or shaft and inserted in a vessel containing the cream or other fluid to be whipped or beaten.

In the accompanying drawings I have illustrated my invention, showing several of the many forms in which it may be embodied.

In such drawings, Figure 1 shows the beater as applied to a shaft and placed in operative position in a container holding a quantity of the fluid, showing also the preferred form of the beater. Fig. 2 is an elevation of the beater as seen from a position at right angles to that represented in Fig. 1. Fig. 3 is an elevation of a modified form of beater containing the essential features of the invention. Fig. 4 is a similar view showing another form of the invention.

The same reference characters indicate the same parts in all the figures.

Referring to the drawings, $a$ represents a shaft adapted to be suitably supported and driven at an extremely high speed of rotation, conveniently and preferably by an electric motor. Preferably also the manner of supporting the shaft is such that it extends vertically and with its lower end clear of the supporting means. It is further adapted to be inserted in the open top of a vessel in which the fluid to be beaten is contained. The beater constituting my invention is mounted upon the lower end of the shaft $a$ either permanently or detachably, but preferably detachably by means of threads formed on the end of the shaft and engaging complemental threads formed in or on a part of the beater.

The beater in its preferred form consists of a disk or plate $c$ and a frame $d$. The disk is arranged co-axially with the shaft, and consequently its plane is transverse to the shaft and to its axis of rotation. The frame $d$ is conveniently made of wire or of a flat spring or band having sufficient stiffness to hold its shape, and of a thickness relatively slight as compared with its peripheral area. In one form of the invention the frame is circular and arranged with its plane perpendicular to the disk or plate $c$, as shown in Fig. 2. In this form also the diameter of the frame coincides approximately with the axis of rotation. Thus the frame presents two members or portions, namely the portions $d'$ and $d^2$, which are eccentric and approximately parallel to the axis of rotation, and said members are carried bodily in a path around the axis of rotation. As the members themselves are of slight width compared with their distance from the axis, they do not set up a very pronounced whirling motion in the fluid, or at least do not cause such fluid to whirl so rapidly as they themselves rotate, and so they pass rapidly through the liquid, causing its particles to be broken apart, and beating minute quantities of air among the particles. The action of the beater upon cream is such that the cream remains of a smooth even texture, without becoming frothy, and without having bubbles large enough to be perceptible, but in a brief period of time is brought to that condition known as whipped cream, being no longer liquid, or even fluid.

I have found that the disk or button $c$ exerts an important influence upon the action of the beater, producing a circulation in the liquid and causing the particles thereof to flow radially outward toward the sides of the receptacle, thence downward, and thence inward. It prevents the cream from becoming frothy and appears to keep its condition smooth and homogeneous until it is completely whipped. These results are augmented by making the disk convex on its under side.

I do not intend by the foregoing statements to be understood as limiting my invention to a beater including as a part thereof such a disk as above described, as I intend to include within the scope of the invention a beater from which the disk is omitted. Neither do I limit my invention to any particular form of beating frame, for many modifications over the form above described may be made, without passing beyond the scope of the invention or of the claims following this description.

In one form of the invention shown in Fig. 3 the equivalent of the frame $d$ is shown at $e$ and is a distorted and incomplete hoop or band secured at its ends to the disk. However, it has two portions $e'$ and $e^2$ extending downward from the disk eccentric to the axis of rotation and movable bodily through the liquid about the axis of rotation.

In the modification shown in Fig. 4 the equivalent frame is represented at $f$ and is made as an approximately elliptic ring arranged with its plane substantially in the axis of the shaft and with its major axis inclined to the shaft. This frame also has members ($f'$ and $f^2$) eccentric to the axis of rotation, movable bodily about the same, but located at respectively different distances therefrom. The shape of the outline of the frame is not material to the essence of the invention, and neither is it material that the frame should form a closed outline. It is sufficient to meet the broader aspects of the invention that the frame or its equivalents should present one or more members eccentric to the axis of rotation and projecting downward from the under side of the disk, whereby such member or members may be moved bodily through the fluid.

Although I have described the beater as suitable for whipping cream, and it is especially efficient for such use, I do not thereby intend to limit the invention to any particular application, but reserve the right to apply it for all uses of which it is susceptible.

I claim,—

1. A mixing agitator or beater adapted to be connected to a shaft and adapted to be immersed in the liquid to be beaten, comprising beating elements eccentric to the shaft and an imperforate plate or disk secured to the upper ends of said elements and having a convex under surface overlying the elements to prevent spattering of the liquid.

2. A mixing agitator for beating fluid food products comprising a rotatable shaft adapted to enter the liquid acted on, beating elements eccentric to the shaft carried and rotated thereby below the lower end thereof, and an imperforate disk or plate, so arranged over the beating elements and between the same and the shaft as to cause a flow of the liquid outward, downward, and inward.

3. A cream whipper, comprising a rotatable shaft adapted to be entered into a receptacle containing cream, a disk or button affixed to the end of said shaft and lying in a plane transverse to the shaft, and a loop or ring connected to the under side of the disk and occupying a plane perpendicular thereto and including the axis of the shaft, said disk and loop being connected together and detachable from said shaft as a unit.

4. A mixing agitator or beater comprising a disk having a convex under surface and having provisions for being mounted detachable on a shaft, and beating elements extending downwardly from the under side of said disk on opposite sides of the center thereof, said elements being bent toward each other and joined together at a distance below the disk.

In testimony whereof I have affixed my signature, in presence of two witnesses.

BURT E. SHATTUCK.

Witnesses:
ARTHUR H. BROWN,
LILLIAN F. CONNELL.

Copies of this patent may be obtained for five cents each, by addressing the "Commissioner of Patents, Washington, D. C."